(12) United States Patent
Le et al.

(10) Patent No.: US 7,251,878 B2
(45) Date of Patent: Aug. 7, 2007

(54) METHOD AND APPARATUS FOR DEFINING LEADING EDGE TAPER OF A WRITE POLE TIP

(75) Inventors: Quang Le, San Jose, CA (US); Jui-Lung Li, San Jose, CA (US); Yvette Chung Nga Winton, San Francisco, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 381 days.

(21) Appl. No.: 10/884,368

(22) Filed: Jun. 30, 2004

(65) Prior Publication Data

US 2006/0002024 A1   Jan. 5, 2006

(51) Int. Cl.
  *G11B 5/187* (2006.01)
  *B44C 1/22* (2006.01)
(52) U.S. Cl. .............. 29/603.16; 29/603.12; 29/603.18; 29/603.13; 29/603.15; 216/22; 216/41; 216/66; 216/89; 204/192.2; 204/192.35
(58) Field of Classification Search ............ 29/603.16, 29/603.12, 603.07, 603.18, 603.15, 603.23, 29/603.13; 204/192.2, 192.35; 216/22, 216/38, 41, 52, 66, 88, 89; 360/122, 125, 360/317
See application file for complete search history.

(56) References Cited

U.S. PATENT DOCUMENTS 4,807,076 A    2/1989  Nakashima et al.

| 6,683,749 B2 * | 1/2004 | Daby et al. .......... 29/603.18 X |
| 2002/0034043 A1 | 3/2002 | Okada et al. |
| 2002/0080524 A1 | 6/2002 | Takahashi et al. |
| 2002/0170165 A1 | 11/2002 | Plumer et al. |

FOREIGN PATENT DOCUMENTS

| JP | 57-113411 | * | 7/1982 | ................ 216/22 |
| JP | 60083209 | | 5/1985 | |
| JP | 60136015 | | 7/1985 | |
| JP | 60154309 | | 8/1985 | |
| JP | 62262213 | | 11/1987 | |
| JP | 63029311 | | 2/1988 | |
| JP | 63098815 | | 4/1988 | |
| JP | 63195818 | | 8/1988 | |
| JP | 3209609 | | 9/1991 | |
| JP | 4-65827 | * | 3/1992 | ........ 204/192.32 X |
| JP | 2002133610 | | 5/2002 | |

* cited by examiner

*Primary Examiner*—A. Dexter Tugbang
(74) *Attorney, Agent, or Firm*—David W. Lynch; Chambliss, Bahner & Stophel PC

(57) ABSTRACT

A method and apparatus for defining leading edge taper of a write pole tip is disclosed. The fabrication process uses reactive ion etching to fabricate LET with tight control of the placement of LET's edge and to achieve higher angle for providing a higher effective write field at the pole tip while minimizing ATI for high-density perpendicular recording. The placement of a resist's edge is used to define the LET's edge and a CMP process is used to provide a planar surface for the fabrication of the write pole.

11 Claims, 10 Drawing Sheets

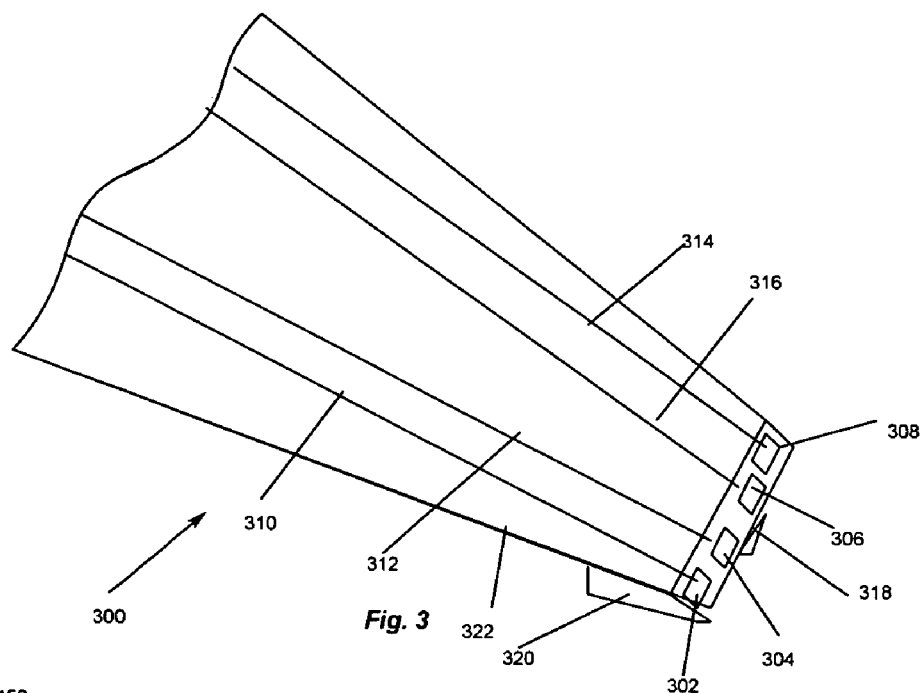
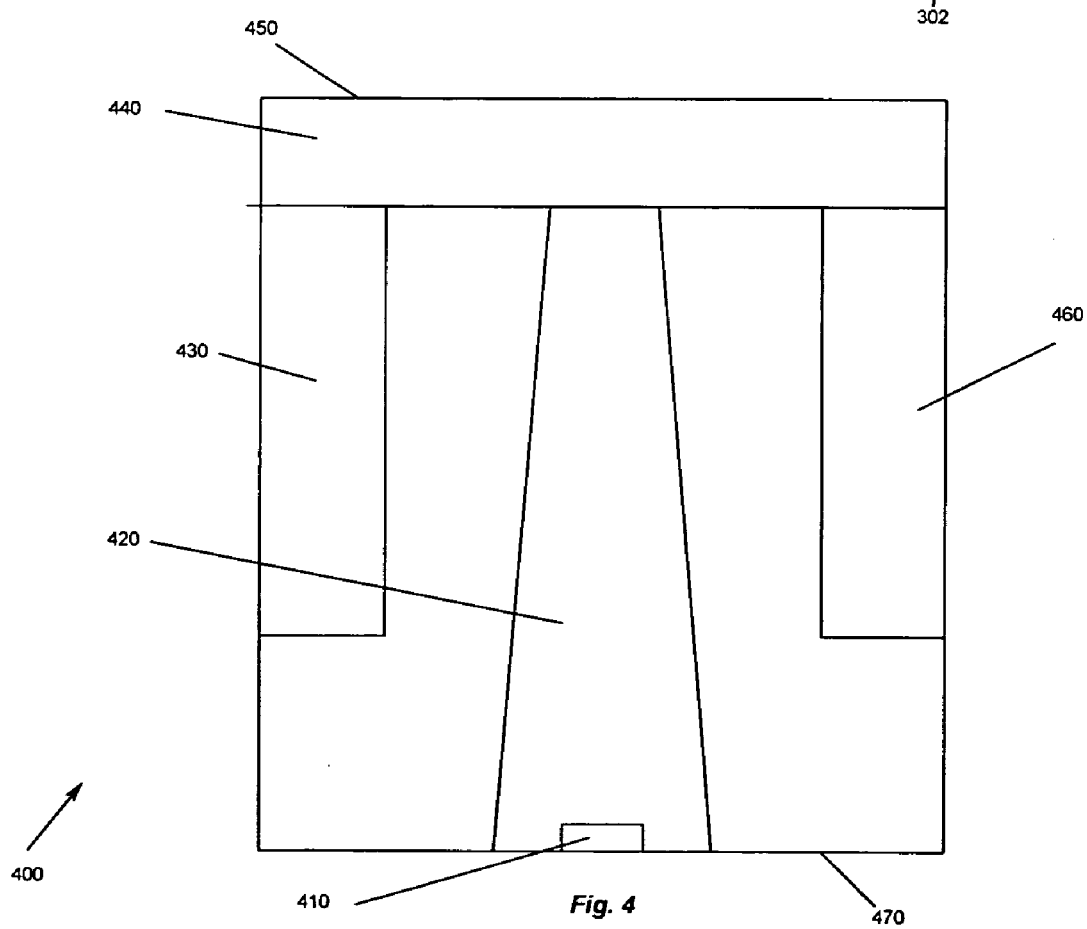

METHOD AND APPARATUS FOR DEFINING LEADING EDGE TAPER OF A WRITE POLE TIP

BACKGROUND OF THE INVENTION

1. Field of the Invention

This disclosure relates in general to magnetic storage systems, and more particularly to a method and apparatus for defining leading edge taper of a write pole tip.

2. Description of Related Art

There has been huge progress in the field of magnetic storage system technology in almost 50 years. Moreover, the rate of this progress is increasing year after year. Such success has made storage systems an important component of modern computers.

Some of the most important customer attributes of any storage system are the cost per megabyte, data rate, and access time. In order to obtain the relatively low cost of today's storage system compared to solid state memory, the customer must accept the less desirable features of this technology, which include a relatively slow response, high power consumption, noise, and the poorer reliability attributes associated with any mechanical system. On the other hand, magnetic storage systems have always been nonvolatile; i.e., no power is required to preserve the data, an attribute which in semiconductor devices often requires compromises in processing complexity, power-supply requirements, writing data rate, or cost.

Improvements in areal density have been the chief driving force behind the historic improvement in storage cost. In fact, the areal density of magnetic storage systems continues to increase. While nature allows us to scale down the size of each bit of information, it does not allow scaling to happen forever.

Today, as the magnetic particles that make up recorded data on a storage system become ever smaller, technical difficulties in writing and reading such small bits occur. Further, as areal density increases, the requirements put on head designs will change.

In a magnetic head, a read element and a write element are formed having an air bearing surface ABS, in a plane, which can be aligned to face the surface of the magnetic disk. The read element includes a first shield, a second shield, and a read sensor that is located within a dielectric medium between the first shield and the second shield. The most common type of read sensor 48 used in the read/write head 28 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element is typically an inductive write element that includes the second shield that functions as a first pole for the write element and a second pole disposed above the first pole. The first pole and the second pole contact one another at a backgap portion, with these three elements collectively forming the yoke. The combination of a first pole tip portion and a second pole tip portion near the ABS are sometimes referred to as the ABS end 56 of the write element. Some write elements have included a pedestal that can be used to help define track width and throat height. A write gap is formed between the first and second poles in the area opposite the back gap portion. The write gap is typically filled with a non-magnetic, electrically insulating material that forms a write gap material layer. A conductive coil passes through the yoke. The write head operates by passing a write current through the conductive coil. Because of the magnetic properties of the yoke, a magnetic flux is induced in the first and second poles by write currents passed through the coil. The write gap allows the magnetic flux to fringe out from the yoke thus forming a fringing gap field and to cross the magnetic recording medium that is placed near the ABS.

As the demand for storage has increased dramatically over time, technologists have worked toward increasing the amount of information that can be stored onto disc drives. By increasing the areal density—or the amount of information that can be placed within a given area on a disc drive—technologists in fact have been able to deliver densities in excess of 100 percent annually over the course of the last several years. A key end-result or benefit of this dramatic areal density curve is that disc drive manufacturers have also been able to drive down the cost of the disc drives themselves because they can offer higher capacity disc drives using fewer platters, heads, and mechanical parts.

For the past 40 years, longitudinal recording has been used to record information on a disc drive. In longitudinal recording, the magnetization in the bits on a disc is flipped between lying parallel and anti-parallel to the direction in which the head is moving relative to the disc.

However, increasing areal densities to allow greater capacities is no small task. Today it is becoming more challenging to increase areal densities in longitudinal recording. To go to even higher areal densities, researchers are looking at several alternatives, including perpendicular recording.

In recent years, the increased demand for higher data rate and areal density has correspondingly fueled the perpendicular head design to scale toward smaller dimensions and the need for constant exploration of new head designs, materials, and practical fabrication methods. A robust head design must consider the challenges in forming a beveled write pole, placement of the flare point and edge of the leading edge tapering (LET), and aggressive alignments and throat heights of the critical layers in the head design to achieve optimal effective write field and field gradient while minimizing adjacent track issues (ATI).

The write pole (P3) is the critical structure in the head design that needs to be optimized to bring maximal effective write field to the pole tip. One approach is to "bring" the flare point of P3 and the flux guide layer (P2) closer to the air bearing surface (ABS) to achieve higher write field. However, this has proven to be challenging because the ability to simultaneously control both flare point and track-width using ion milling approach is difficult due to the physical nature of this destructive method.

Equally challenging in "bringing" the flux guide layer closer to the ABS is ATI issues. The P2 structure is much bigger in area at the ABS view as compared to the write pole. A write field that is generated by an applied current would prefer to leak from P2 instead of being funneled toward the pole tip. When P2 is brought closer to the ABS, it will contribute significantly to ATI such as side writing and side erasure. One promising approach is to introduce leading edge tapering (LET) to the pole tip. This method would essential bring a more effective write field to the P3 pole tip and relax the stringent requirement to bring the flare point and P2 shaping layer closer to the ABS to achieve higher write field.

The effectiveness of tapering is achieved when it is self-aligned to P3 and the tapering angle is optimized at forty-five degree or more. Controlled methods using ion mill approach to fabricate LET in the past have proven to be of great difficulty to simultaneously achieve both optimal LET angle, tight placement of the LET's edge and couple this process into P3 fabrication to define LET's width at the ABS to minimize ATI issues.

It can be seen then that there is a need for a method and apparatus for defining leading edge taper of a write pole tip.

SUMMARY OF THE INVENTION

To overcome the limitations described above, and to overcome other limitations that will become apparent upon reading and understanding the present specification, the present invention discloses a method and apparatus for defining leading edge taper (LET) of a write pole tip.

The present invention solves the above-described problems by providing a fabrication process that uses reactive ion etching to fabricate LET with tight control of the placement of LET's edge and to achieve higher angle for providing a higher effective write field at the pole tip while minimizing ATI for high-density perpendicular recording. The placement of a resist's edge is used to define the LET's edge and a chemical mechanical polishing (CMP) process is used to provide a planar surface for the fabrication of the write pole.

A method for defining leading edge taper of a write pole tip in accordance with an embodiment of the present invention includes forming a flux guide recessed a predetermined amount from an air bearing surface, depositing a reactive ion etch sacrificial and CMP stop layers, lithographically patterning a single layer resist structure, using reactive ion etching (RIE) to etch the CMP stop layer and taper the unexposed RIE sacrificial layer with a desired angle, depositing high magnetic induction material over the tapered mask, wherein the desired angle of the RIE sacrificial layer defining a LET edge and performing CMP to planarize and remove excess high magnetic induction material and stop on the CMP stop layer to provide a planar surface for the fabrication of the write pole.

In another embodiment of the present invention, a write head is provided. The write head includes a flux guide recessed a predetermined amount from an air bearing surface, a leading edge taper formed above the flux guide, the leading edge taper having a first tapered edge disposed a first predetermined amount from an air bearing surface and a and a second tapered edge disposed a second predetermined amount from the flux guide and a write pole formed above the leading edge taper, wherein the write pole includes a flare point defining a flare length from the flare point to the air bearing surface, wherein the at the air bearing surface a thickness of the write pole is defined primarily by just the write pole due to the taper of the lead edge taper and at the flare point the thickness of the write pole is defined by the combination of lead edge taper and write pole.

In another embodiment of the present invention, a magnetic storage device is provided. The magnetic storage device includes at least one magnetic storage medium, a motor for translating the magnetic storage medium, an actuator and a write head, coupled to the actuator, the actuator configured for moving the write head relative to the at least one magnetic storage device, the write head further including a flux guide recessed a predetermined amount from an air bearing surface, a leading edge taper formed above the flux guide, the leading edge taper having a first tapered edge disposed a first predetermined amount from an air bearing surface and a and a second tapered edge disposed a second predetermined amount from the flux guide and a write pole formed above the leading edge taper, wherein the write pole includes a flare point defining a flare length from the flare point to the air bearing surface, wherein the at the air bearing surface a thickness of the write pole is defined primarily by just the write pole due to the taper of the lead edge taper and at the flare point the thickness of the write pole is defined by the combination of lead edge taper and write pole.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for defining leading edge taper of a write pole tip. The present invention provides a fabrication process that uses reactive ion etching to fabricate LET with tight control of the placement of LET's edge and to achieve higher angle for providing a higher effective write field at the pole tip for high density perpendicular recording.

Figure 1:
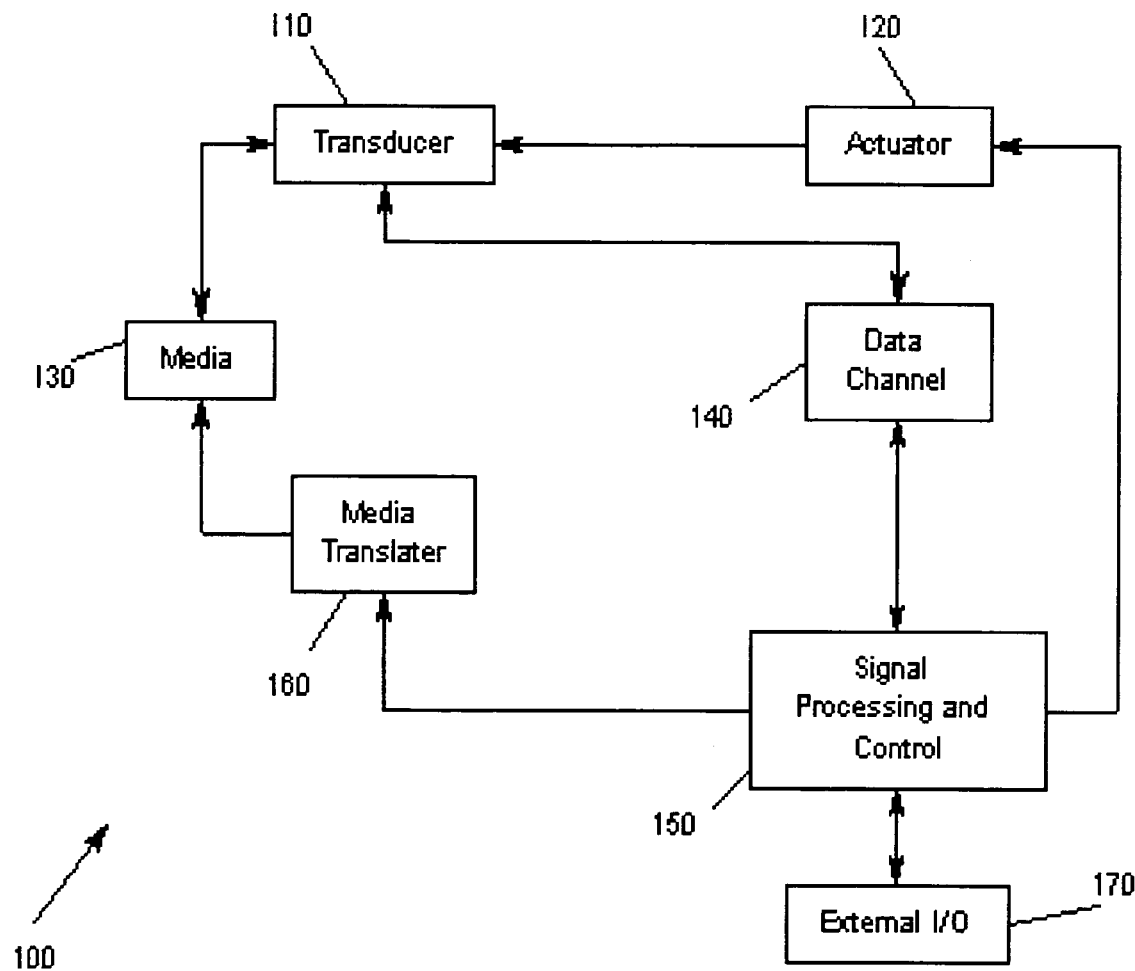
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
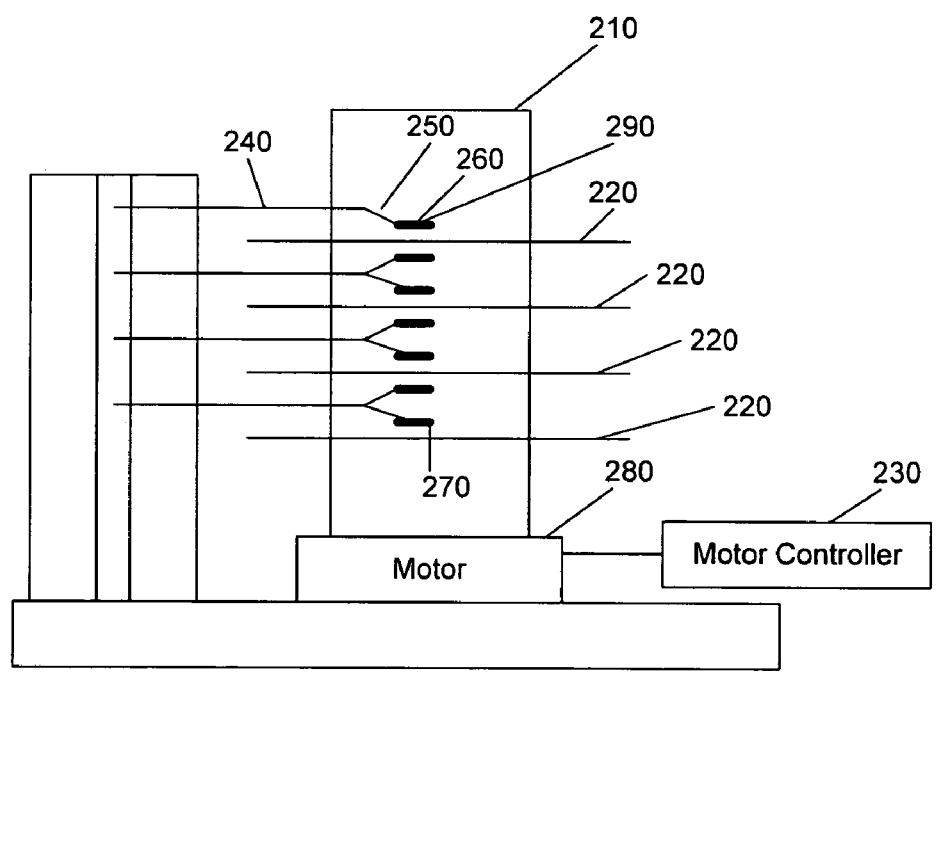
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider 400 has a center rail 420 that may support the magnetic head 410. The slider 40 also includes side rails 430 and 460. Those skilled in the art will recognize that the location of a magnetic head 410 is not meant to be limited to the center rail as shown in FIG. 4. Rather, the structure shown in FIG. 4 is merely one example. Also shown in FIG. 4 are support rails 420, 430 and 460 that extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
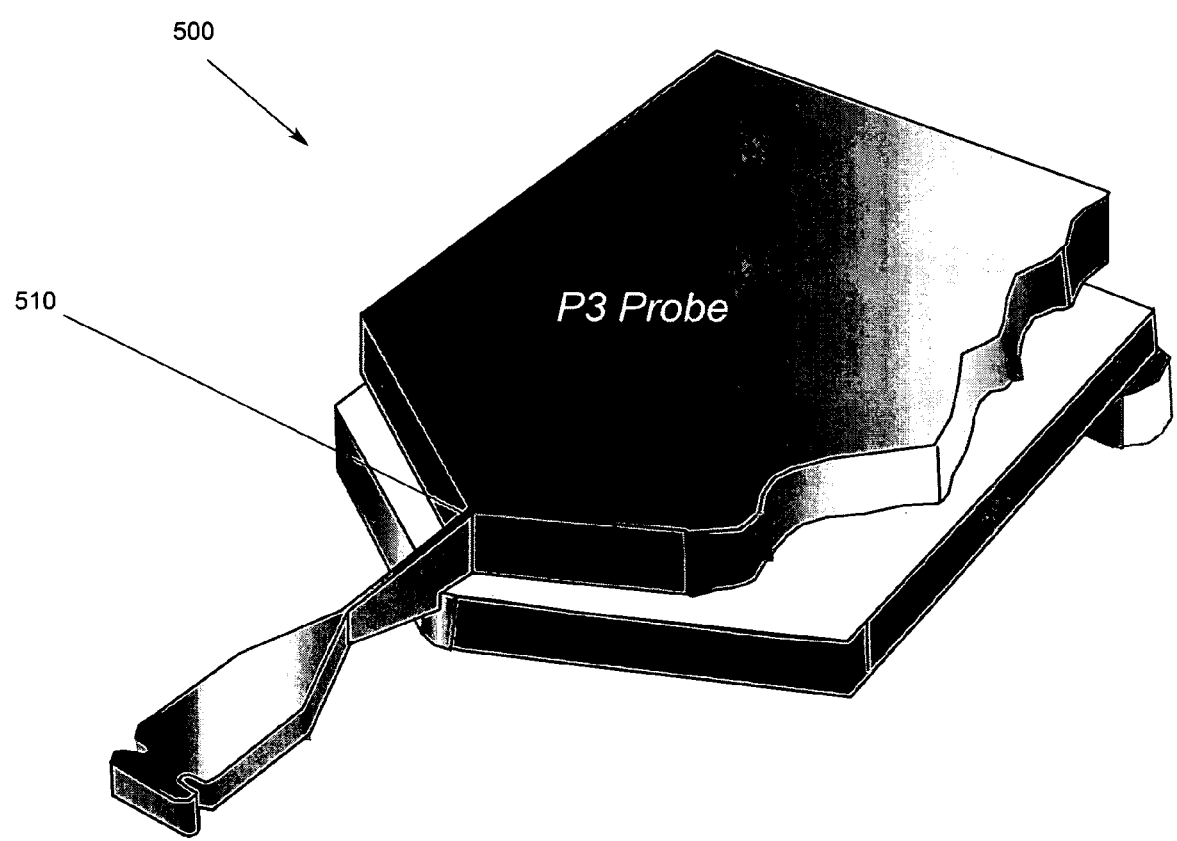
FIG. 5 illustrates a P3 probe according to an embodiment of the present invention.
Figure 6:
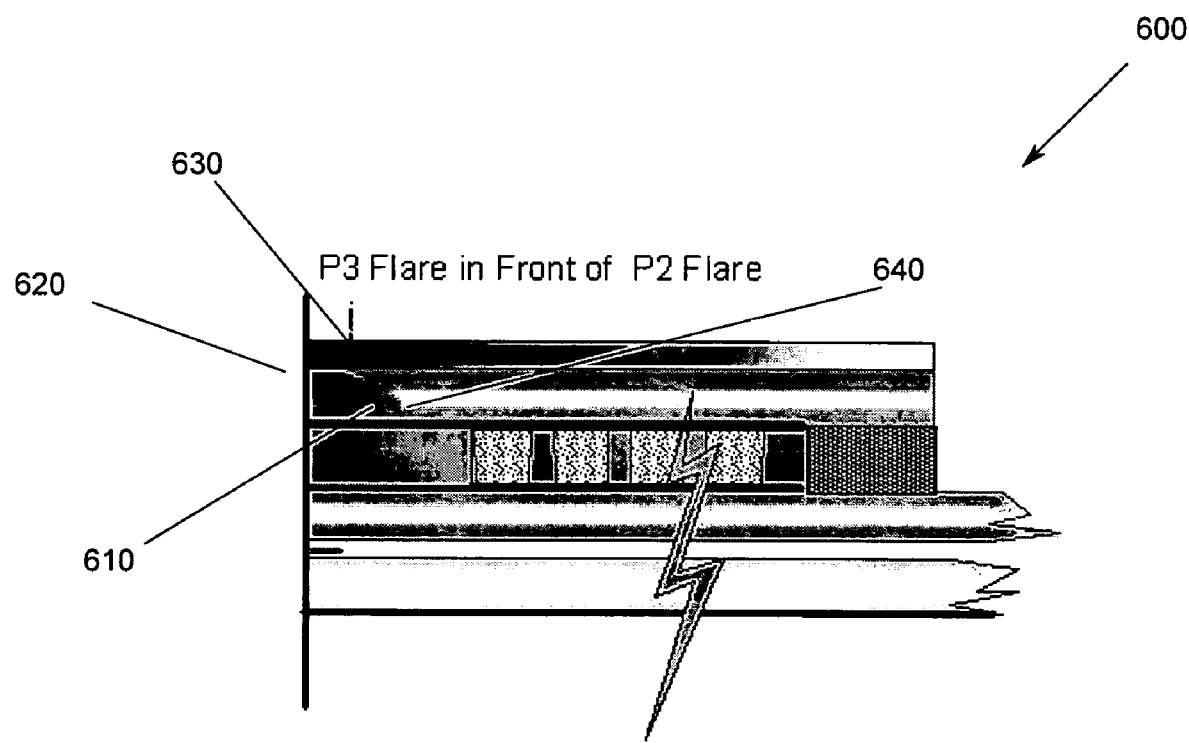
FIG. 6 shows a write head with the leading edge tapering at the pole tip according to an embodiment of the present invention.

According to embodiments of the present invention, a method and apparatus for defining leading edge taper of a write pole tip is provided. The process and design provide probe for a write head that is defined by reactive ion etching (RIE) of an opaque material such as Ta as example to produce a slanted sloped probe in front of the flux guide layer (P2). FIG. 5 illustrates a P3 probe 500 according to an embodiment of the present invention. In FIG. 5a, the P3 probe 500 is clearly shown with a flared point 510. The pole tip 500 has been formed with leading edge tapering (LET) according to the present invention. FIG. 6 more clearly shows a write head 600 with the leading edge tapering 610 at the pole tip 620. Further, the P3 flare 630 can clearly be seen in front of the P2 flare 640. Thus, a method for providing LET with tight control of the placement of LET's edge and higher angle for providing a higher effective write field at the pole tip while minimizing ATI for high-density perpendicular recording according to an embodiment of the present invention would essentially bring a more effective write field to the P3 pole tip.

Figure 7:
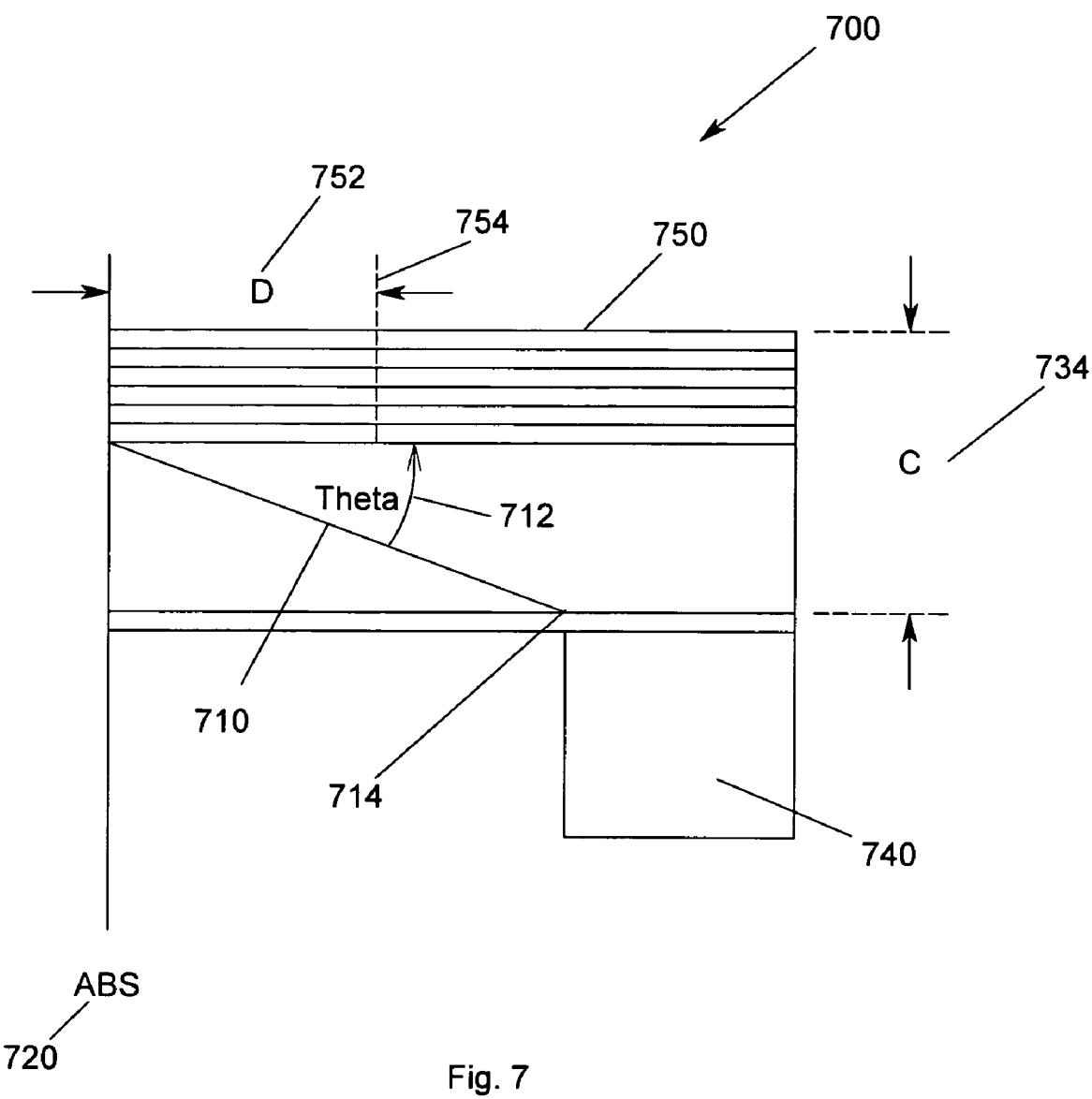
FIG. 7 is a side view of the leading edge taper design of a write head according to an embodiment of the present invention.

FIG. 7 is a side view of the leading edge taper design of a write head 700 according to an embodiment of the present invention. A write head may include a flare point 754 and shaping layer 740 that when brought close to the ABS would bring higher effective write field to the pole tip 750. As described earlier, at higher areal density, the write pole 750 is laminated to reduce remanence and formed by an ion milling process, which is difficult to simultaneously control both track-width and flare point placement. If the shaping layer 740 is brought closer to the ABS, it will contribute ATI. According to an embodiment of the present invention, a leading edge taper (LET) layer 710 is fabricated by extending and tapering a small portion so that the LET 710 extends and tapers up to the ABS 720 with a width dimension of the write pole.

More specifically, in FIG. 7, the leading edge taper (LET) 710 provides higher tapering angles, θ 712, to achieve higher effective write field. Moreover, the LET 710 is brought to the ABS 720 for higher effective field. Since LET's width is the same as the write pole's trackwidth, ATI issues is minimized. The height of P3 750 including the taper 710 has a height, C 734.

Since LET layer 710 is coupled to the fabrication of the write pole 750, the thickness of the LET 710 is coupled to the thickness of the write pole 750 during ion mill pole fabrication, i.e., a sufficient ion mill hard mask is needed to pattern the write pole 750 and the LET 710. In addition, write pole remanence has been an issue in the past. The flare length, D 752, i.e., the distance from the flare point 754 to the ABS 720, is greater than just the thickness of the write pole 750. Remanence can be reduced by increasing the thickness of the write pole 750 to equal the distance of (D). Without LET 710, the thickness of the write pole 750 can not be increased due to potential of writing on adjacent tracks on the media. However, with the LET 710, this is possible because at the ABS 720, the thickness of the write pole 750 is defined primarily by just the write pole 750 due to the taper of the LET 710. At the flare point 754, the thickness of the write pole is the combination of LET 710 and write pole 750, i.e., C 734. The thickness of the LET 710 can be adjusted to reduce remanence. Beside reducing remenance, increasing the thickness of the write pole (LET to pole thickness), the effective field flux to the pole is increased, i.e., more area, thicker. This is important because as areal density is increased, the pole thickness (skew design) and trackwidth (areal density) must be reduced. This results in a reduction in the amount of effective field that may be brought to the pole tip. However, with LET, the total thickness can be increased without affecting skew design and trackwidth. The flux guide layer (P2) 740 may be recessed from the point of taper 714, and the flare point 754 is recessed from the ABS 720 by a length, D 752.

In one embodiment of the present invention, the tapering of the LET 710 starts at the ABS 720 and ends at the edge of P2 740 closest to the ABS as shown in FIG. 7. However, those skilled in the art will recognize that the geometry of the LET 710 in relation to P2 740 is not meant to be limited to that shown in FIG. 7. Rather, due to potential alignment issue, the flux guide P2 740 can be recessed from the point of the taper 714 by a length, but the degree of the recess reduces effective write field. Still further, the angle 712 of the LET 710 is not meant to be limited to the angle depicted in FIG. 7, but rather preferably includes an angle equal to or greater than 45°.

Figure 8:
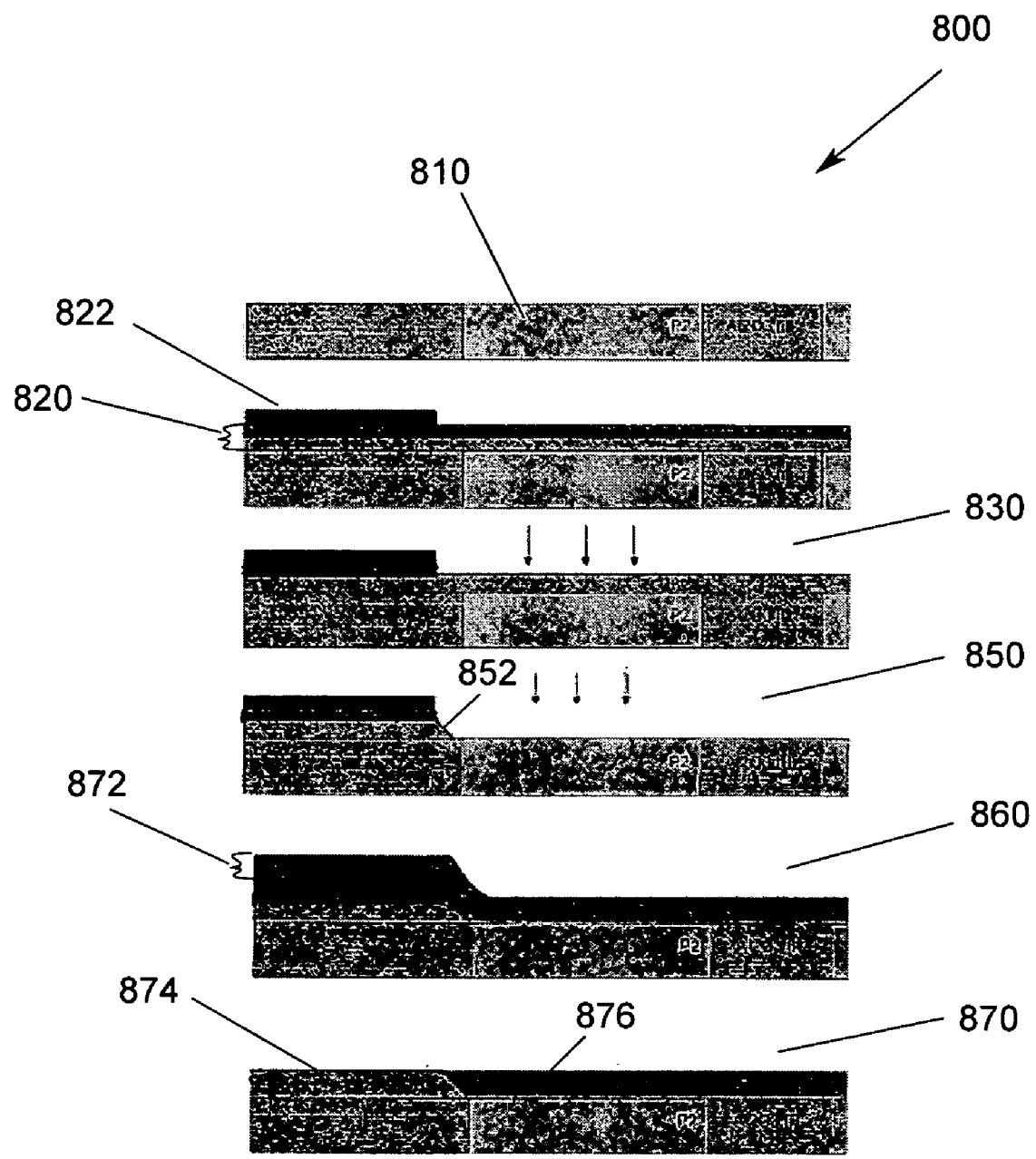
FIG. 8 illustrates a method for forming a leading edge taper for a write pole using a reactive ion etching approach according to an embodiment of the present invention.

FIG. 8 illustrates a method for forming a leading edge taper for a write pole using a reactive ion etching approach 800 according to an embodiment of the present invention. Placement of LET's edge and tapering is critical and it is defined lithographically. Tight control of the critical dimension (CD) is important. Since the transparent LET is fabricated on top of the opaque shaping layer P2, which may be alumina, light scattering effects will make controlling CD difficult. The selections of reactive ion etch sacrificial and CMP stop layers are important. The desired materials should be opaque. The preferred material is Ta for the sacrificial layer and DLC for the CMP stop layer.

In FIG. 8, a flux guide (P2) 810 is formed. A reactive ion etch sacrificial layer and CMP stop layer are deposited 820 and a single layer resist structure 822 is lithographically patterned. Reactive ion etching (RIE) is shown 830, 850 for etching the CMP stop layer and taper the unexposed RIE sacrificial layer with a desired angle 852 in 860, high magnetic induction ($B_s$) material 872 is deposited over the tapered mask 852 then in 870, CMP is performed to planarize, remove excess of material 872 and stop on the CMP stop layer 874. The placement of the single resist's edge 852 would define the edge of LET 876 and the CMP process would provide a planar surface for the fabrication of the write pole. However, LET fabrication is not finished. During ion milling to fabricate the write pole, the ion mill is extended to define the width of LET.

In another embodiment, the LET 876 may have an angle equal to or greater than 45°. Rather, than merely performing RIE step to form the desired angle, tapering may be initiated using ion milling with RIE being used thereafter to increase the tapering angle. After the angle 852 has been formed, the LET material 872 is deposited in 860. The LET material is a material that has a high magnetic induction, $B_s$. After the LET material is deposited, the superfluous amounts of material 872 are removed in 870. CMP is performed to remove the excessive high magnetic induction material and planarize surface for the subsequent step of fabricating the write pole. Reactive ion etching is performed to remove the DLC layer. Since DLC consists of carbon on top of Si, sputter etch of the surface is performed prior to P3 lamination deposition. Thus, the method of FIG. 8, provides a high tapering angle, tight control of the LET's edge placement, and a planar surface for write pole.

Figure 9:
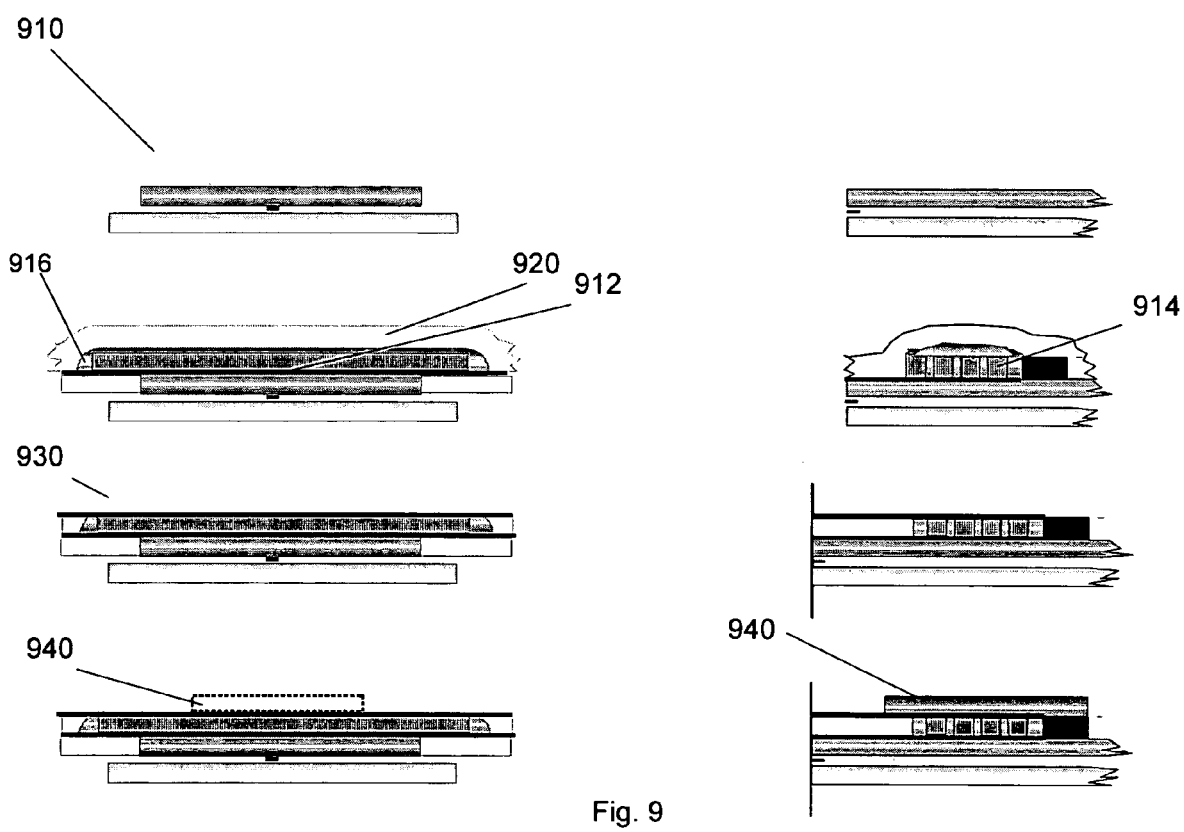
FIGS. 9–11 illustrate a second method for forming a leading edge taper for a write pole according to an embodiment of the present invention.
Figure 10:
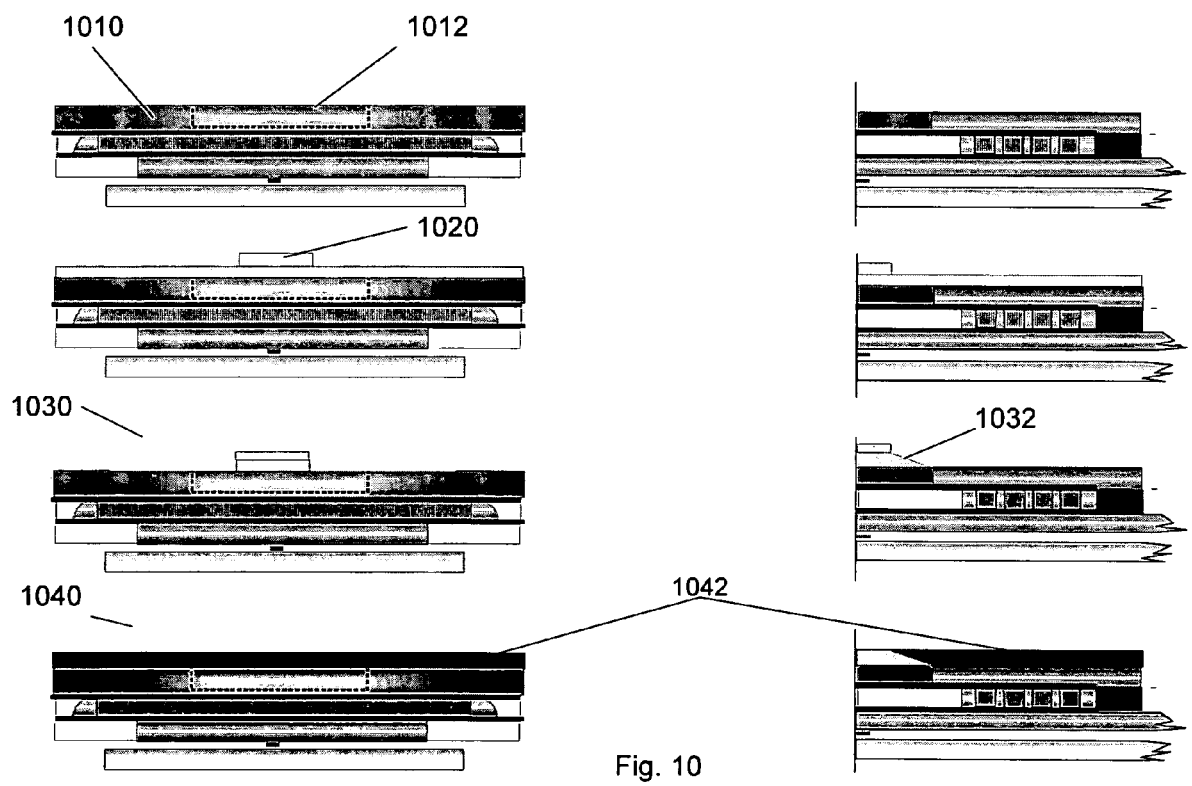
Figure 11:
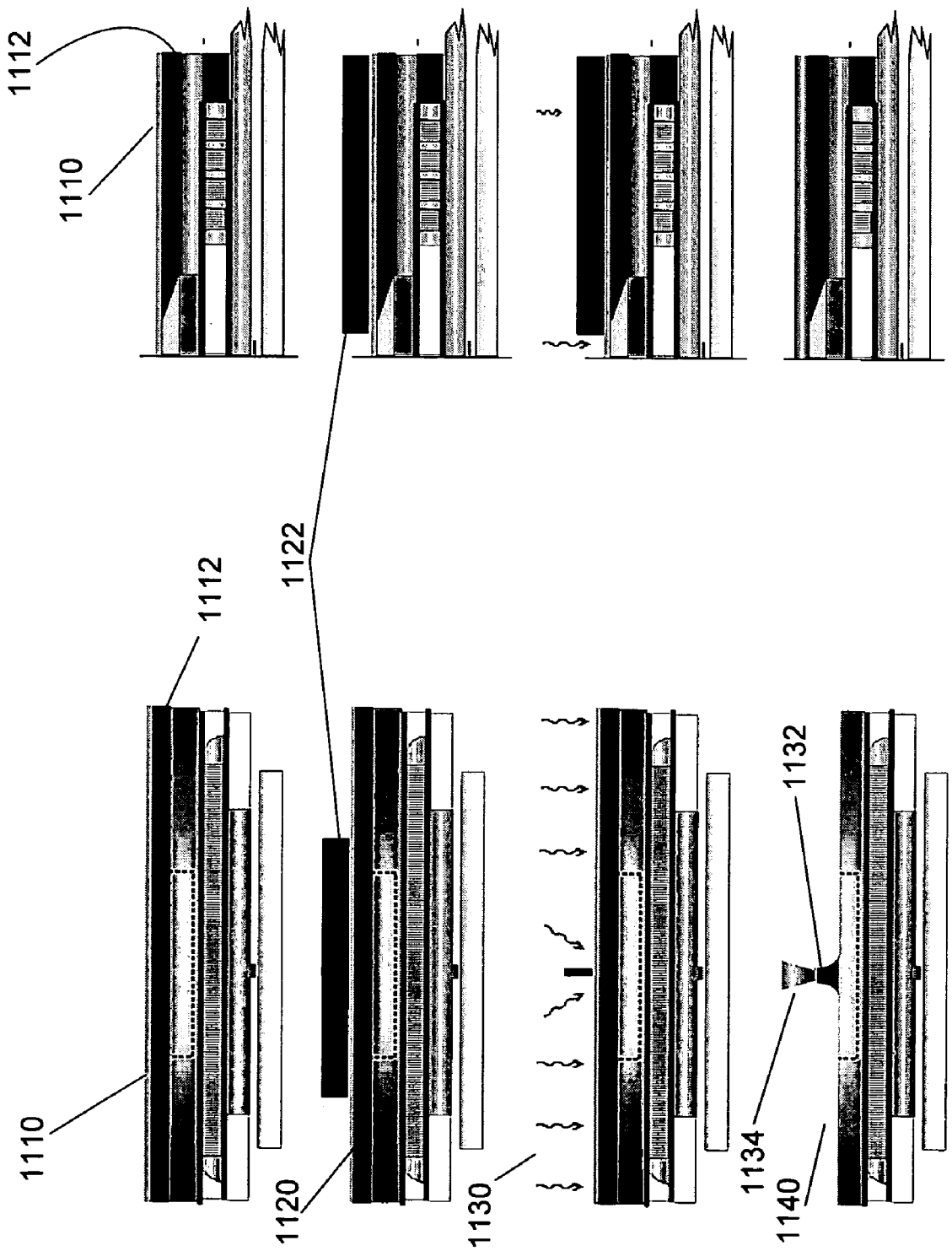

FIGS. 9–11 illustrate a second method for forming a leading edge taper for a write pole according to an embodiment of the present invention. The method shown in FIGS. 9–11 demonstrate the integration of the LET and write pole processing to define the LET's width from ABS. In FIG. 9, the read head is fabricated 910. P1 912 is planarized and then the coils 914, insulation 916 and back gap (not shown) are deposited. A thick alumina layer 920 is then applied. The alumina isolation layer is chemical mechanical polished flat 930. The P2 shaping layer is fabricated 940.

FIG. 10 shows the depositing of an insulator such as alumina 1010 and the subsequent chemical mechanical polishing to planarize and expose the top of the P2 shaping layer 1012. Depositions of reactive ion etch sacrificial layer such as Ta and CMP stop layer such as DLC are examples. Lithography using a single layer resist structure 1020 that comprises depositing a diamond-like carbon (DLC) layer, a hard mask, ans a thin deep ultraviolet layer, and is used to define the LET's edge and as a RIE mask. RIE is performed 1030 to etch the CMP stop layer and taper the unexposed RIE sacrificial layer with a desired angle 1032. In 1040, high magnetic induction material 1042 is deposited over the tapered mask then CMP is done to planarize, remove excess high magnetic induction material, and stop on the CMP stop layer. However, LET fabrication is not complete because during ion milling to fabricate the write pole, the ion mill is extended to define the width of LET. In this case, RIE is used to remove the DLC layer. Write pole material such as a laminate layer of magnetic and non-magnetic is deposited on top of the P2 shaping layer.

In FIG. 11, a thin layer of carbon is deposited 1110 full film over the top surface of the pole tip material 1112. However, those skilled in the art will recognize that the thin layer could be another suitable material, such as rhodium (Rh) or ruthenium (Ru). A hard mask layer 1120 is then formed in full film over stop layer and a central resist structure 1122 is formed over hard mask layer along the ABS in a central area. The hard mask layer 1120 may be, for example, made of polymide or epoxy. Preferably, central resist structure 1122 is made of a silicon-containing resist. The width of central resist structure 1122 is formed wider than the desired width of a pole tip to bevel and trim the write pole's trackwidth. Note also that a rear edge of central resist structure 1122 extends over only a small portion of shaping layer. Exposed portions of hard mask layer 1120 and stop layer are then patterned in accordance with central resist structure 1122 and removed. The materials may be removed using etching techniques such as by RIE.

Thus, a central hard mask 1122 and a central stop layer are formed underneath central resist structure 1122, such that top surfaces of pole tip materials outside central resist structure are exposed. Note that an additional layer may be deposited between hard mask layer 1120 and central resist structure 1122 to separate the RIE into two separate steps using different RIE chemistry for better selectivity. For example, the additional layer may be a RIEable material such as Ta, Ta2O5, SiOxNy, SiO2, Si3N4, and Ta3N5, as examples, the first RIE chemistry may be based on fluorocarbon such as CF4/CHF3 as examples, and the second RIE chemistry may be based on O2, CO2, NH3/H2, or H2/N2 as examples. An ion milling process is then performed 1130 over the structure to remove pole tip materials exposed outside central resist structure and using a high angle to produce trapezoidal probes 1132. The ion mill is also extended to define the width of LET.

An insulator such as alumina is then deposited over the structure. The insulator is formed to a height that exceeds the height of CMP stop or DLC layer. A planarization process 1140, such as a CMP, is performed over the structure so as to form a top planarized surface with alumina 1134 and pole tip structure 1132. The CMP is performed until the stop layer above the pole is reached, which resists any further CMP. The CMP removes top portions of non-magnetic RIEable materials as well as planarizes the top surface of the structure. The insulator materials is left remaining adjacent and behind pole tip structure. Note that, as an option, an additional CMP stop layer is deposited in the field and adjacent pole tip structure prior to the CMP for enhanced CMP stopping.

Thus, the effectiveness of tapering is achieved when it is self-aligned to P3 and the tapering angle is optimized at forty-five degree or more. Adhesion of seed layer is secured to produce a continuous film for void-free damascene plating fill of etched trenches on the surface of the wafer. Fabrication of the probe in thin resist overcomes the limitation of direct photolithography of fabricating high aspect ratio sub-micron trackwidth features. The method according to an embodiment of the present invention provides flexibility to fill the probe trench with any materials (magnetic or non-magnetic) via either fullfilm electroplating or sputter deposition. Further, the ability to control and produce a slanted probe at 45 degree or greater during RIE pattern transfer into the hard mask is extensible to very narrow dimensions. The damascene process is simplified by using a hard mask that functions as CMP stop, adhesion layer, pattern transfer layer, and a RIEable layer. The pole tip definition and top surface topography planarity are controlled by CMP.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for defining leading edge taper of a write pole, comprising:
   forming a flux guide recessed a predetermined amount from an air bearing surface;
   depositing a reactive ion etch sacrificial layer and CMP stop layer;
   lithographically patterning a single layer resist structure;
   using reactive ion etching to etch the CMP stop layer and taper the unexposed reactive ion etch sacrificial layer with a desired angle;
   depositing high magnetic induction material over the tapered reactive ion etch sacrificial layer, wherein the desired angle of the reactive ion etch sacrificial layer defines a leading edge taper edge; and
   performing chemical mechanical polishing to planarize and remove excess high magnetic induction material and stop chemical mechanical polishing on the CMP stop layer to provide a planar surface for the fabrication of the write pole.

2. The method of claim 1 further comprising initiating tapering of the reactive ion etch sacrificial layer using ion milling before using reactive ion etching to taper the reactive ion etch sacrificial layer with a desired angle.

3. The method of claim 1, wherein lithographically patterning the single layer resist structure further comprises depositing a DLC layer, a hard mask, and a thin deep ultraviolet layer.

4. The method of claim 1, wherein the using reactive ion etching to taper the reactive ion etch sacrificial layer with the desired angle further comprises performing reactive ion etching to transfer an image of a leading edge taper and performing reactive ion etching to form the desired angle.

5. The method of claim 1, wherein the using reactive ion etching to taper the reactive ion etch sacrificial layer with the desired angle further comprises using the reactive ion etching to taper the RIE sacrificial layer with an angle of 45° or greater.

6. The method of claim 1, wherein the depositing a the high magnetic induction material over the tapered reactive ion etch sacrificial layer further comprises depositing the leading edge taper material having a high magnetic induction.

7. The method of claim 1 further comprises removing remaining superfluous layers.

8. The method of claim 1 further comprises
   fabricating a read head;
   planarizing a first pole of the read head, forming coils, depositing an insulation layer over the coils and forming an alumina layer over the insulation layer and the coils; and
   chemical mechanical polishing the alumina layer to flatten the alumina layer.

9. The method of claim 1 further comprising:
   depositing a layer of carbon;
   fabricating a P3 Probe and yoke photo mask; and
   reactive ion etching the carbon.

10. The method of claim 1, wherein the depositing the reactive ion etch sacrificial layer further comprises depositing a Tantalum layer.

11. The method of claim 1, wherein the using reactive ion etching further comprises using flurocarbon chemistry.

* * * * *

UNITED STATES PATENT AND TRADEMARK OFFICE
CERTIFICATE OF CORRECTION

PATENT NO.       : 7,251,878 B2                                        Page 1 of 1
APPLICATION NO.  : 10/884368
DATED            : August 7, 2007
INVENTOR(S)      : Le et al.

It is certified that error appears in the above-identified patent and that said Letters Patent is hereby corrected as shown below:

Column 8, Line 10: "ans" should read -- and --

Signed and Sealed this

Twentieth Day of November, 2007

JON W. DUDAS
*Director of the United States Patent and Trademark Office*